United States Patent Office 3,494,867
Patented Feb. 10, 1970

3,494,867
HIGH VISCOSITY INDEX, FLAME-RESISTANT, HYDRAULIC FLUIDS
Bruce W. Hotten, Orinda, Calif., assignor to Chevron Research Company, San Francisco, Calif., a corporation of Delaware
No Drawing. Continuation-in-part of application Ser. No. 563,988, July 11, 1966. This application June 24, 1968, Ser. No. 739,202
Int. Cl. C09k 3/02
U.S. Cl. 252—75                       10 Claims

ABSTRACT OF THE DISCLOSURE

Method of transmitting power with hydraulic fluid having as a base a 5-alkyl-1,2,3,4,7,7-hexachloronorbornene.

Cross reference to related applications

This application is a continuation-in-part of copending application Ser. No. 563,988, filed July 11, 1966 and now abandoned.

Background of the invention

The growth of automated industrial equipment has greatly increased the need for nonflammable hydraulic oils. A number of materials have been employed in the past for this purpose. Included among these are the so-called phosphate fluids, or phosphate esters of various types. These materials, while extensively employed in aircraft because of their low densities, are not especially suitable for heavy industrial use precisely because of the low density; high density fluids act as much better power transfer agents. Also, the phosphate materials are low in flame resistance and have low viscosity indices, requiring the addition of substantial amounts of various viscosity index improvers in order to make them suitable for use over a variety of temperature ranges. This addition usually results in even lower flame resistance. Other materials that are often employed are chlorinated alkanes, such as chlorinated waxes. However, these materials require chlorination in the order of at least 40% to achieve substantial flame resistance, and at such a chlorine concentration, have viscosities so high that they are unsuitable for low temperature operation and also have low viscosity indices. Chlorinated arenes, also commonly used, have extremely low viscosity indices.

The importance of high viscosity index in a hydraulic fluid results from the fact that systems are often required to be operated at considerable variations in temperature. Thus, if a fluid that is employed has a very low viscosity index, it will be suitable for operation over only a very limited temperature range. Thus, if it is desired to change the operating range of the equipment, it is necessary to drain the fluid from the system and replace it with one of suitable viscosity range for the desired temperature of operation. The viscosity index is especially important since hydraulic fluids usually serve a lubricating function as well as simply being a means of power transmission. Therefore, a fluid which becomes low in viscosity or extremely viscous at high temperature will fail to lubricate properly.

Materials similar to those used in this invention are disclosed in U.S. Patent 2,881,223 to Louis Schmerling, wherein the compounds are shown to be useful as insecticides.

Summary of the invention

It has now been found that an improved method of transmitting hydraulic power can be employed using as a power transmission media a fluid having as a base a 5-alkyl-1,2,3,4,7,7-hexachloronorbornene of the formula

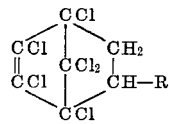

in which R is an alkyl group of from 7 to 18, preferably 9 to 12, carbon atoms. R may be straight- or branched-, but is preferably straight-chain.

Description of the preferred embodiments

The alkylhexachloronorbornenes employed in this invention can be conveniently prepared by reacting hexachlorocyclopentadiene (diene) with a terminal olefin (dienophile). Preferred olefins are cracked wax olefins which are produced by the thermal cracking of petroleum waxes.

The reaction is thus a Diels-Alder adduction. Reference to the reaction involving hexachlorocyclopentadiene may be found in an article by C. W. Roberts, "Chemistry of Hexachlorocyclopentadiene," Chemistry and Industry, Feb. 1, 1958, pp. 110–115. The reaction is generally carried out by heating approximately stoichiometric proportions of the diene and the olefin together at temperatures of from about 90° C. to 200° C. for a period of from about 2 to 24 hours; a 2 to 8 hour period is generally sufficient.

The olefin that is employed in the reaction is preferably a cracked wax olefin. Materials having from about 9 to about 20 carbon atoms are suitable, although a fraction having from 11 to 14 carbon atoms is a preferred material. The cracked wax olefins are essentially straight-chain materials and these are preferred, although some internal branching and substitution is allowable. However, materials having internal double bonds and no terminal double bonds will not react under the conditions above specified.

In order to employ the esters as bases for hydraulic fluids, it is usually necessary to combine them with conventional hydraulic fluid additives. For high temperature use it is especially desirable that a proton or acid acceptor and a rust inhibitor be included in the compositions.

*Example 1.*—Preparation of 5-alkyl-1,2,3,4,7,7-hexachloronorbornene 1050 grams (6 mols) of a $C_{11}$–$C_{14}$ cracked wax olefin fraction (MW–175) was mixed with 1638 grams (6 mols) of hexachlorocyclopentadiene in a 3-liter, 3-neck glass fitted with a stirrer, condenser, thermostat, and nitrogen inlet. An infrared analysis was obtained of the mixture. The mixture was blanketed with nitrogen, and with stirrer operating was heated slowly over a period of about 1 hour and 45 minutes to a temperature of 130° C. The temperature was maintained at about 130° C. for a period of 3 hours, at which time the heating was increased and the sample was heated for approximately 5 hours at about 140° C. At this point, spontaneous temperature rise indicated that a reaction was taking place and the temperature was maintained for an additional 3½ hours at about 150° C. Infrared analysis indicated that reaction was complete. The reaction product was vacuum distilled under a pressure of about .7 mm. of Hg to remove starting materials. The unreacted materials were removed in an initial cut and a cut of product 67 ml. was obtained. The product had a percent chlorine of 48, compared with 46.9 theoretical.

The primary advantage of the use of alkylhexachloronorbornene-based fluids in hydraulic systems inheres in the high viscosity indices of the materials compared with other commonly used flame resistant fluids. Thus, this feature, combined with excellent flame resistance, makes them suitable for use in a wide variety of hydraulic power transmission applications. A series of base materials was prepared employing the procedure of Example 1. The physical properties of these materials were determined and compared with those of two commercially available flameproof hydraulic fluids. The materials tested are as follows:

(A) alkylhexachloronorbornene from $C_9$–$C_{11}$ cracked wax olefin. R=7–9
(B) alkylhexachloronorbornene from $C_{11}$–$C_{15}$ cracked wax olefin. R=9–13
(C) alkylhexachloronorbornene from $C_{15}$–$C_{20}$ cracked wax olefin. R=13–18
(D) commercially available chlorinated wax base hydraulic fluid.
(E) commercially available chlorinated biphenyl base hydraulic fluid.

The viscosities at 100° and 200° F., the viscosity indices, the pour point and density of the materials are shown in Table I, following.

ing weight loss, were tested without additives and proper inhibitors reduce these factors.

In order to demonstrate the flame resistance of the fluids employed in the invention, they were subjected to 5 commonly employed flammability tests. The tests are as follows: Flash point (ASTM D–92–57), autogenous ignition test (ASTM D.286.58T), the pipe wick test in which passes through the flame are recorded, and low pressure spray measured on a 1 to 10 scale of increasing resistance. Reference to the latter two tests may be found in aeronautical material specifications 3150–C (Society of Automotive Engineers). Data from these tests, comparing two other norbornenes with commercial fluid E, are included in Table III.

TABLE III.—FLAME RESISTANCE OF 5-ALKYL-1,2,3,4,7,7-HEXACHLORO-NORBORNENES

| Fluid | Flash point, °F. | Autogenous ignition temperature, °F. | Pipe wick test, passes through flame | Low pressure spray 1-10 scale, increasing flame resistance |
|---|---|---|---|---|
| A (norbornene) | | 550 | 79 | 9 |
| B (norbornene) | 450–500 | 750 | 49 | 9 |
| E (chlorinated biphenyl) | 550 | | 24 | 9 |

As can be seen from these data, the 5-alkyl-1,2,3,4,7,7-hexachloronorbornene oils possess flame resistance characteristics comparable to those of commercially available flame-resistant fluids.

In using the fluids in hydraulic systems, it is necessary to employ, in addition to the alkylhexachloronorbornene bases, certain conventional hydraulic fluid additives.

TABLE I.—PHYSICAL PROPERTIES OF ALKYLHEXACHLORONORBORNENES

| Fluid | Viscosity, 100° F., SUS | Viscosity, 210° F., SUS | Viscosity index | Pour point, °F. | Density at 250° F. | Percent actual | Chlorine, theoretical |
|---|---|---|---|---|---|---|---|
| A | 208 | 47 | 104 | −40 | 1.3 | 52 | 52 |
| B | 317 | 52 | 82 | −44 | 1.2 | 45 | 46 |
| C | 194 | 47 | 112 | 20 | 1.13 | 44 | 42 |
| D | 3,600 | 145 | 60 | | | 40 | |
| E | 210 | 37 | Negative | 20 | 1.4 | 48 | |

It may be seen from these data that the alkylhexachloronorbornenes have excellent viscosity indices, acceptable pour points and relatively high densities.

The stability of the compounds was tested by a heat stability test in which the fluid was heated for a period of 4 hours at 300° F. in the presence of a steel wire and the viscosity change at 210° F. was measured as well as the degree of staining of the steel wire. Hydrolytic stability was determined in a test in which the fluid was placed in contact with water and heated for a period of 48 hours at a temperature of about 200° F. The change in viscosity at 210° F., the staining and weight loss of a copper plate immersed in this solution, percent insolubles remaining in material, and the neutralization number were each measured and recorded. Fluids A and B were tested and compared with fluid F, a commercially available compounded chlorobiphenyl hydraulic fluid.

Thus, for prolonged use, the fluids must contain a conventional acid acceptor, a conventional antioxidant, or a combination of both. For use in systems in which iron or steel will be contacted by the fluid, the use of a conventional rust inhibitor is necessary. Other conventional additives such as viscosity index improvers, dyes, oiliness agents, etc., may also be used.

The oxidation inhibitors which may be used in the fluids are, as noted, conventional materials for functional fluid use in general. The preferred materials are the arylamines and the hindered phenols. However, also suitable are a large variety of materials which have conventionally been used in functional fluids as antioxidants and anticorrodents.

Thus, in addition to the amines and phenols, materials may be employed such as phenothiazines, hydroxy anthracenes, metal dithiocarbamates and dithiocarbamate esters,

TABLE II.—STABILITY OF ALKYLHEXACHLORONORBORNENES

| | Heat stability (4 hours at 300° F.) | | | Hydrolytic stability (48 hours at 200° F.) | | | |
|---|---|---|---|---|---|---|---|
| Fluid | Viscosity, 210° F., percent change | Steel wire stain | Neutralization number | Viscosity, 210° F., percent change | Copper stain | Copper wt. loss, mg. | Insolubles, percent |
| B | +7.2 | Trace | 1.2 | −2.9 | Slight | 3.8 | 0.01 |
| C | +5.8 | Medium | 0.1 | +0.58 | Grey | 0.18 | 0.1 |
| F | −3 | Trace | 0.1 | −4 | Trace | 0.02 | |

From these data it may be seen that the alkylhexachloronorbornenes are quite stable, exhibiting only a small change in viscosity increase in both tests. It may also be noted that the materials, while somewhat higher in staining of the copper and steel wires and in decreasmetal dithiophosphates, dithiophosphate esters, dialkyl monosulfides, disulfides, alkyl sulfonamides, diaryl monosulfides, tetraalkyl titanates, etc.

A general description of the antioxidants may be found in Scott, Atmospheric Oxidation and Antioxidants, Elsevier, Amsterdam, 1965. Particular reference to the most suitable antioxidants may be found on p. 251 et seq. under "Lubricating Oil Antioxidants."

Examples of the diarylamine inhibitors which may be used include diphenylamine, phenyl-α-naphthylamine, and phenyl-β-naphthylamine, and the alkylated derivatives of these compounds containing alkyl groups of from 1 to 20 carbon atoms; and related compounds such as 4,4'-diaminodiphenyl methane, etc.

Suitable phenolic inhibitors include bis-phenol alkanes, bis-phenol sulfides, dihydroxy diphenyls, acylamino phenols, dihydroxybenzenes, and various p-tertiary alkyl bridged phenols, such as p-tert. butyl phenol, etc. A wide variety of these materials are disclosed in the Scott reference, previously mentioned, especially on pp. 283–290.

The acid acceptors which are employed in the fluids are materials which act as proton acceptors and prevent the buildup of corrosive acids in the fluids when they undergo decomposition under prolonged use at high temperatures. A preferred class of materials is the epoxy compounds, especially epoxidized naturally occurring material, such as epoxidized unsaturated glycerides, etc. Examples of suitable materials include epoxidized soybean oil, epoxidized castor oil, epoxidized linseed oil, epoxidized fats, etc. Other suitable materials include epoxy esters such as butyl epoxy acetoxy stearate, glyceryl triepoxy acetoxy stearate, isooctyl epoxy stearate, epoxidized isooctyl tallate, etc. In general, the acid portion of the simple esters and the glycerides will have from about 10 to 30 carbon atoms.

Also suitable are various alkyl and aralkyl epoxides such as epoxy decane, epoxy dodecane, epoxy hexadecane, epoxy octadecane, epoxy eicosane, etc. Cyclo-aliphatic epoxides, such as cyclododecane, pinene oxide, etc., are also suitable. 10–30 carbons are preferred with these materials.

Also suitable are glycidol and various glycidol ethers, such as glycidol phenyl ether, glycidol allyl ether, 2,2-bis(p-phenyl glycidoxy) propane, etc.

Other suitable acid acceptors are the metal alkyl phenates, and their sulfurized derivatives. Especially preferred are the overbased materials in which a base reserve is provided by the ratio of equivalents of alkaline earth to equivalents of phenol substantially greater than that in the normal salts. As noted, both the sulfonated and unsulfonated materials have been "overbased." Many methods of overbasing have been disclosed; typical materials are set forth in U.S. Patents Nos. 3,178,368, 3,194,761, and 3,336,224. A typical normal sulfurized alkaline earth phenate may be represented by the formula:

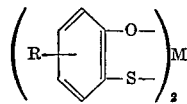

in which R represents the alkyl radicals on the benzene ring, and M is an alkaline earth metal. The sulfur is attached to both rings. Other configurations are possible, i.e., rather than two like rings being connected in the above example, attachment may be made to an alkaryl, aryl, alkyl, or alkyl-aryl group.

The metals may be aluminum, cobalt, chromium, sodium, lead, etc. or an alkaline earth metal such as calcium, barium, strontium, or magnesium. The preferred metal is calcium.

Another important class of acid acceptors which may be used are the oil-soluble salts of high molecular weight sulfonic acid usually produced by the treatment of petroleum oils with fuming sulfuric acid.

The overbased materials which are equivalent to the overbased phenates are preferred.

The sulfonic acids generally have molecular weights from about 350 to 650. Many patents have described the material; typical are U.S. 2,454,736 and U.S. 2,467,176. Overbased materials are described in U.S. 2,833,716 and many other patents.

The acid acceptors and oxidation inhibitors are employed in minor amounts, sufficient to prevent decomposition of the fluid and attacks upon the hydraulic systems. Amounts of from 0.1 to 10% by weight are usually sufficient; 0.1 to 5% is preferred.

The rust inhibitors which may be used include a wide variety of materials commonly employed in functional fluids. Thus, the rust inhibitors may include high molecular weight amines, alkyl maleamides, other amides, alkyl and alkenyl succinic acids, pyromellitic acid amide, trimellite acid amides, etc. Specific examples of useful inhibitors include acyl sarcosines, such as oleyl sarcosine, ethoxylated soybean amine, the maleamide produced from reaction of maleic anhydride and soybean amine, amide from the reaction of alkenyl succinic anhydride ($C_{10}$–$C_{20}$ alkenyl) with dibutylamine, and an amide produced by reaction of alkenyl succinic anhydride with diethylamine. The amide type of rust inhibitor is preferred.

Rusting tests were performed to determine effective inhibitors for use in the compositions. The test employed was the humidity cabinet test, ASTM D–1748–62T. In this test, steel panels with a prescribed surface finish are coated with a test oil, allowed to drain, and suspended in a humidity cabinet at 120° F. for a specified number of hours. Results are determined and recorded as percent of the steel surface covered with rust after a certain number of hours' exposure. The tests were performed using the following series of rust inhibitors at a concentration of 0.5% by weight in fluid D;

Inhibitor 1—calcium petroleum sulfonate;
Inhibitor 2—oleyl sarcosine (N-methylglycine);
Inhibitor 3—ethoxylated soybean amine having about 15 ethoxyl groups.
Inhibitor 4—Maleamide produced by reaction of maleic anhydride and soybean amine;
Inhibitor 5—amide produced by reaction of alkenyl succinic anhydride ($C_{10}$–$C_{20}$ alkenyl) with dibutyl amine;
Inhibitor 6—Amide as in Inhibitor 5 from diethyl amine.

Data from the rusting tests are shown in the following table.

TABLE IV.—RUSTING TESTS ON 5-ALKYL-1,2,3,4,7,7-HEXACHLORONORBORNENE FLUIDS ASTM D–1748—PERCENT RUST ON STEEL PLATES

| Inhibitor, | Hours | | | | |
| 0.5% Conc. | 20 | 24 | 50 | 120 | 360 |
| --- | --- | --- | --- | --- | --- |
| 1 | | 0, 0 | | 5, 5 | Heavy |
| 1 | | 0, 0 | | 40, 30 | Heavy |
| 2 | 0, 0 | | 10, 0 | | |
| 3 | 60, 70 | | 60, 70 | | |
| 4 | 70, 70 | | 70, 70 | | |
| 5 | 70, 80 | | 70, 80 | | |
| 6 | 70, 70 | | 70, 80 | | |

From these data, it may be seen that Inhibitors 1 and 2 significantly decrease the rusting, while the other materials at the same 0.5% concentration are somewhat effective, though to a lesser degree.

The rusting inhibitors are generally present in amounts of from 0.1 to 5% by weight, a preferred range being from about 0.5 to 2%.

In addition to the additives previously mentioned, other conventional additives may be employed in the compositions. For example, supplementary oxidation inhibitors such as the various phenolic inhibitors and diarylamine inhibitors may be used. While the fluid bases themselves have outstanding viscosity indices, it may be desirable in many applications to include commonly used viscosity index improvers in order to achieve even higher viscosity indices. Examples of these inhibitors are the acryloids, etc. Dyes, sludge inhibitors, antifoaming agents, etc., may also be included.

The hydraulic systems in which the methods and compositions of this invention are very useful are, as previously noted, industrial systems used to transmit power to various items of machinery. These systems are becoming increasingly important in industry because of the ease with which they may be adapted to automatic and computerized control. In general, two major components characterize the systems. These components are a means to impart pressure to the fluid and a second means for converting the pressure to useful mechanical motion. These components usually are piston- or vane-type pumps; however, other high pressure pumps are suitable. Secondary components of the systems usually include a reservoir for storage of fluids, means to control the flow, such as valves, and means, such as pipes, to conduct the fluid from the reservoir to the pump and to the motor.

The pumps which are used to impart pressure to the fluid, and the hydraulic motors which receive energy from the fluid, are constructed to minimize leakage at high pressures. Thus, close tolerances must me maintained in equipment, and the hydraulic fluids must lubricate the parts as well as transmit power. Thus, the fluids of this invention are especially advantageous for use in these systems because of their high indices and pour points which allow lubrication of the parts subject to wear over quite wide temperature ranges, from about −40° F. to over 300° F.

I claim:

1. A method of transmitting power which comprises applying force to a hydraulic power transmission fluid consisting essentially of 5-alkyl-1,2,3,4,7,7-hexachloronorbornene of the formula:

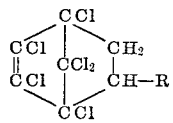

in which R is alkyl of from 7 to 18 carbon atoms.

2. The method of claim 1 in which R contains from 9 to 12 carbon atoms.

3. The method of claim 2 in which R is substantially straight-chain.

4. The method of claim 1 wherein the power transmission fluid contains from 0.1 to 10% by weight of diarylamine as an antioxidant.

5. A power transmission fluid consisting essentially of a major portion of a 5-alkyl-1,2,3,4,7,7-hexachloronorbornene of the formula:

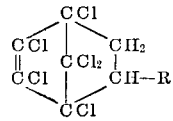

in which R is alkyl of from 7 to 18 carbon atoms and a minor portion of an acid acceptor which is overbased metal alkyl phenate or overbased metal petroleum sulfonate, wherein the acid acceptor is present in an amount sufficient to prevent acid buildup in the fluid.

6. The fluid of claim 5 in which the acid acceptor is an overbased calcium alkylphenate.

7. The fluid of claim 5 which contains in addition a minor portion of diaryl amine in an amount sufficient to inhibit oxidation.

8. The fluid of claim 7 in which the diaryl amine is pheny-α-naphthylamine.

9. The fluid of claim 5 in which R contains from 6 to 16 carbon atoms.

10. The fluid of claim 5 in which R is substantially straight-chain.

References Cited

UNITED STATES PATENTS 2,881,223   4/1959   Schmerling.

LEON D. ROSDOL, Primary Examiner

M. HALPERN, Assistant Examiner

U.S. Cl. X.R.

252—78; 260—648